(12) United States Patent
Bernard et al.

(10) Patent No.: US 8,115,435 B2
(45) Date of Patent: Feb. 14, 2012

(54) DEVICE FOR CONTROLLING A POLYPHASE SYNCHRONOUS ROTARY ELECTRICAL MACHINE AND POLYPHASE SYNCHRONOUS ROTARY ELECTRICAL MACHINE CONTAINING SUCH A DEVICE

(75) Inventors: François-Xavier Bernard, Creteil (FR); Christophe Louise, Alforville (FR); Hugues Doffin, Chatenay Malabry (FR)

(73) Assignee: Valeo Equipements Electriques Moteur, Creteil (FR)

( * ) Notice: Subject to any disclaimer, the term of this patent is extended or adjusted under 35 U.S.C. 154(b) by 417 days.

(21) Appl. No.: 12/476,727

(22) Filed: Jun. 2, 2009

(65) Prior Publication Data
US 2009/0302791 A1    Dec. 10, 2009

(30) Foreign Application Priority Data
Jun. 4, 2008  (FR) ...................... 08 53700

(51) Int. Cl.
*H02P 6/00* (2006.01)
*H02P 27/06* (2006.01)
(52) U.S. Cl. ............... 318/400.17; 318/400.04; 318/139
(58) Field of Classification Search ............. 318/400.04, 318/400.12, 400.13, 400.14, 400.17, 139, 318/254; 702/94; 310/309
See application file for complete search history.

(56) References Cited

U.S. PATENT DOCUMENTS

| 4,532,461 | A | * | 7/1985 | Crook ...................... 318/400.21 |
|---|---|---|---|---|
| 4,962,976 | A | * | 10/1990 | Takahashi et al. ............ 318/811 |
| 5,200,675 | A | | 4/1993 | Woo |
| 5,872,435 | A | | 2/1999 | Bolte et al. |
| 5,999,431 | A | * | 12/1999 | Sugiyama ........................ 363/95 |
| 6,008,601 | A | * | 12/1999 | Sugiyama ................ 318/400.29 |
| 6,515,443 | B2 | * | 2/2003 | Kelly et al. .................... 318/599 |
| 7,205,738 | B2 | * | 4/2007 | Chapman et al. ........ 318/400.12 |
| 2002/0084760 | A1 | * | 7/2002 | Messenger et al. ............ 318/439 |
| 2002/0101208 | A1 | * | 8/2002 | Yost .............................. 318/254 |
| 2005/0006980 | A1 | * | 1/2005 | Horst ............................ 310/309 |
| 2005/0212472 | A1 | * | 9/2005 | Chapman et al. ............. 318/439 |
| 2007/0132409 | A1 | | 6/2007 | Wada et al. |
| 2008/0007137 | A1 | * | 1/2008 | Horst ............................ 310/309 |
| 2009/0167221 | A1 | * | 7/2009 | Rouis ....................... 318/400.14 |

* cited by examiner

*Primary Examiner* — Paul Ip
(74) *Attorney, Agent, or Firm* — Berenato & White, LLC

(57) ABSTRACT

A control device (2''') for an AC-DC current converter associated with a polyphase synchronous rotary electrical machine. The AC-DC current converter contains, for each phase, a branch of two power switches in series, known as high and low (25). The control device (2''') contains means of generating a signal ($\theta(t)$) representing the angular position of the rotor. The control device contains one or more digital tables (20 H, 20 B) addressed by the signal of the angular position of the rotor ($\theta(t)$) and delivering at their outputs binary control signals (200 H- 202 H, 200 B- 202 B), each controlling one branch of power switches (25).

21 Claims, 7 Drawing Sheets

DEVICE FOR CONTROLLING A POLYPHASE SYNCHRONOUS ROTARY ELECTRICAL MACHINE AND POLYPHASE SYNCHRONOUS ROTARY ELECTRICAL MACHINE CONTAINING SUCH A DEVICE

This application claims the benefit under 35 U.S.C. §119 of French Patent Application No. 08/53700 filed in France on Jun. 4, 2008, the entire disclosure of which is hereby incorporated by reference.

BACKGROUND OF THE INVENTION

1. Field of the Invention

The invention concerns a control device for a polyphase synchronous rotary electrical machine.

More particularly, the invention concerns a control device for an AC-DC current converter associated with such a polyphase synchronous rotary electrical machine and arranged between it and an electrical storage unit consisting of a rechargeable battery.

2. Description of Related Art

It is especially suitable for reversible machines, known as alternator-starters, which are used in the automotive industry, both in alternator mode and in starter mode, or as an aid to moving off (boost mode), typically from 500 rpm.

Within the context of the invention, the term "polyphase" concerns, more specifically, three-phase or hexaphase rotary electrical machines, but may also concern biphase rotary electrical machines or those which operate at a higher number of phases.

For the sake of clarity, the following scenario relates to the preferred application of the invention, i.e. that of a reversible three-phase rotary electrical machine of the alternator-starter type, without this in any way limiting the scope of the invention.

As is well known, a reversible rotary electrical machine contains an alternator comprising:
  a rotor constituting an inductor, traditionally combined with two collector rings and two brushes to supply an excitation current; and
  a polyphase stator, bearing several coils or windings, three in the embodiment in question, constituting an armature, which are star-connected, or most often as a triangle, in the case of a three-phase structure, and which deliver converted electrical power to a bridge rectifier when operating as an alternator. The machine includes two bearings, a front and a rear, to fix it to the thermal engine and to fix the stator. The stator surrounds the rotor. The rotor is carried by a shaft supported by the front and rear bearings. The brushes are connected to a regulator of the alternator to maintain the voltage of the alternator at a desired voltage for a battery, depending whether it is on or off load.

The alternator enables any rotation movement of the inductor rotor driven by the thermal engine of the vehicle to be transformed into an electrical current induced in the stator windings.

The alternator may also be reversible and constitute an electric motor, or rotary electrical machine, enabling the thermal engine of the vehicle to be driven in rotation via the rotor shaft. This reversible alternator is known as an alternator-starter, or alterno-starter. It enables mechanical energy to be transformed into electrical energy, and vice versa.

Thus, in alternator mode, the alternator-starter specifically charges the vehicle battery, while in starter mode, the alternator-starter engages the motor vehicle's thermal engine, also known as internal combustion engine, in order to start it.

In reversible machines from the automotive industry, for example, operating in motor or starter modes, the stator must be current-controlled in such a way that at any moment the necessary torque can be applied to the rotor to impel the required rotation for the operation of the engine. The torque applied to the rotor, and hence the current supplied to the phases of the stator, is a sinusoidal function of the angular position of the rotor in relation to the stator, represented by an angle $\theta$.

FIG. 1, placed at the end of this description, illustrates in diagram form a complete system 1 for detecting the angular position $\theta(t)$ of the rotor of a three-phase alternator-starter and for controlling said organ, either in alternator mode or in engine (starter) mode.

The system 1 consists of four principal sub-systems: an alternator-starter 10, a reversible AC-DC current converter 11, a control module 13 for this converter and a module 12 for detecting the angular position $\theta$ of the rotor 100 (symbolized by an arrow turning about its axis of rotation $\Delta$).

The converter 11 generally consists of a bridge of semiconductor rectifiers 110, comprising three branches of two MOSFET power transistors in series, 1101 to 1103, which will henceforth be referred to arbitrarily as "high" and "low", one for each phase. A structure of this type is well known to the person skilled in the art and there is no need to describe it in further detail. The midpoints of the output branches, 1101 to 1103, constitute the three converter 11 outputs. The ends of the branches 1101 to 1103 are connected to the positive "+", and negative "−" outputs of an electrical energy storage means, for example a battery Bat, with which the vehicle is fitted (not shown in FIG. 1).

In alternator mode, the alternator-starter 10 supplies the converter 11 with three-phase AC current via its three outputs, 101 to 103, which correspond to the junctions between the three coils constituting the stator 104 of the alternator-starter 10. The latter converts the three-phase AC current into DC current in order to (re)charge the battery Bat. This, in turn, supplies various organs of this vehicle: on-board electronics, air conditioning, headlights, etc.

FIG. 1A illustrates in more detail the configuration of the alternator-starter 10 from FIG. 1. The stator 104 contains three windings 1010 to 1030, in triangular configuration, the vertices of which are connected to the outputs 101 to 103.

In engine mode, i.e. in starter mode, it is the alternator-starter 10 which is supplied with three-phase electrical energy by the reversible converter 11, which is operating in three-phase current generator mode.

In this embodiment of the invention relating to a three-phase electrical machine and thus a three-branch transistor bridge, the MOSFET transistors of the branches 1101 to 1103 are controlled according to an appropriate sequence of six control signals, $SC_1$ to $SC_6$, regardless of whichever mode is under consideration. The six control signals, $SC_1$ to $SC_6$, are generated by the control module 13. As is also well known, these signals $SC_1$ to $SC_6$ must be generated synchronously with the angular position $\theta$ of the rotor 100 which detects the relative phases of the currents supplied by the outputs 101 to 103 of the alternator-starter 10 (alternator operating mode), or sent to these outputs (starter operating mode).

For this reason, it is necessary to detect the angular position $\theta$ of the rotor 100 with great precision, in order to achieve correct functioning of the bridge rectifiers 1101 to 1103, in particular to avoid any risk of deterioration of the semiconductor components, but also and above all, in engine or starter mode, to optimize the torque supplied by the alternator-starter 10.

This is the function which is devolved to the module 12 for detecting the angular position θ of the rotor 100 so as to generate a signal θ(t) representing the instantaneous variation of the measured angular position and to transmit it as an input to the control module 13.

In prior art, various methods have been proposed for this purpose.

In particular, the Applicant has proposed, in international patent application WO 2006/010864 A2, a device and a method for detecting the position of a rotor of a rotary electrical machine containing a stator, which makes it possible to obtain the precise angular position sought, while at the same time being cheap, simple to operate and having low sensitivity to magnetic interference.

The device taught in this patent application includes a plurality of magnetic field sensors fixed in relation to the stator of the rotary electrical machine and able to deliver a series of first signals representing a rotating magnetic field detected by these sensors, and means of processing these first signals by an operator able to provide a series of second sinusoidal signals depending on the angular position attained by the rotor.

In one embodiment, illustrated by FIG. 1 which is placed at the end of the present description, three linear Hall effect sensors CA1 to CA3 placed at 120° electric on the rotary electrical machine are used, in this case the alternator-starter 10, facing a target (not shown in FIG. 1) integral with the rotor 100 and magnetized alternately North/South for each pole of the machine. For a more detailed description, it would be advantageous to refer to the description in the previously cited international patent application WO 2006/010864 A2.

The sensors, $CA_1$ to $CA_3$, deliver a series of three signals $CH_1$ to $CH_3$ as output when the alternator-starter 10 is in rotation. It has been found experimentally that these signals, which are referred to as "raw", usually contain a high level of harmonics, in particular a high level of harmonic 3, and their relative amplitudes are different. Hence, it is difficult to construct, from these three far from perfect raw signals, two signals which approach an ideal sinusoidal function (i.e. free from harmonics), with identical amplitudes, zero offsets and mutually phase-shifted in a non-obvious fashion (phase shift not a multiple of 180°), which constitute said second signals.

To alleviate this problem, the basic principle is to find two distinct linear combinations which enable the two sinusoids desired to be obtained, while at the same time finding the best possible solution to the problems raised above.

As a first approximation, it is possible to admit that the sensors $CA_1$ to $CA_3$ have identical, or at least very close, characteristics, that they are placed in an identical thermal and electromagnetic environment and thus that the signals delivered by these sensors retain some common characteristics. These hypotheses lead to the view that:

their offsets develop simultaneously depending on any interference field (such as, for example, magnetization of the rotor);

their levels of order 3 harmonics are very similar and in phase with their fundamental harmonics; and the electrical signals generated by these sensors are phase-shifted by about 120°.

These hypotheses make it possible to choose two linear combinations which partly cancel out the order 3 harmonics and the offsets. Simply by choosing, for linear combinations, the difference between two sensor output signals, one obtains two signals phase-shifted by 60° and which meet the selection criteria mentioned above.

It is then found that the signals obtained are close to ideal sinusoidal functions: they are reentered and contain fewer harmonics than the raw signals.

Nevertheless, the amplitudes of these signals are not completely identical and their offsets are not absolutely zero. This means that a factory calibration stage is required at the end of the manufacturing chain.

To do so, one may subtract an adjustable value from each of the signals in order to cancel each offset. This signed value can be obtained in purely analogue fashion, for example using a potentiometer or an adjustable resistive bridge (for example by using a procedure known as laser trimming) or semi-analogue, by using a digital value converted into an analogue value. Finally, a completely digital solution is also possible, if the signals are converted into digital signals.

With respect to amplitude calibration, a single adjustment is necessary, because it is sufficient for the signal amplitudes to be equal. To do so, a variable gain amplifier can be used. This variable gain amplifier can be purely analogue, semi-analogue or completely digital. It should be noted that the amplitude calibration could have been carried out in advance on two of the raw signals delivered by the sensors $CA_1$ to $CA_3$ so that later linear combinations are more effective in eliminating the order 3 harmonics. The disadvantage of this method lies in the fact that a supplementary adjustment is necessary and that it does not correct any disparities in amplification of the linear combinations themselves.

Once the two sinusoids have been obtained, it becomes possible to extract directly the value of the angular position θ. To do this, by dividing the two signals, one eliminates the amplitude, then, using a mathematical function or a table, the function can be inverted and the angular quadrant determined using the signs of the signals. For the sake of clarity, by way of non-limiting example, if the phase shift between signals is φ=90°, for example, this is an arctangent function. Again, for a more detailed description, it would be advantageous to refer back to the description in the previously cited international patent application WO 2006/010864 A2.

Within the scope of the invention, it is possible to make use of this method, or any other method known in the art, to detect the angular position θ of the rotor 100 with satisfactory precision.

The module 12 for detecting the angular position θ of the rotor 100 delivers at its output a signal θ(t) representing this angular position. This signal may be analogue in form, or, preferably, digital in form if the module 12 is provided with an analogue-digital conversion circuit (not shown).

The signal is transmitted as input to a control module 13 designed to generate a series of control signals for the switching members of the reversible AC-DC current converter 11, said switching members generally consisting of MOSFET power transistors 110, as already stated. In this case, which relates to a three-phase alternator-starter 10, the reversible converter 11 contains three branches of two MOSFET transistors in series, arranged between the "+" and the "−" poles of the battery Bat.

In this embodiment, for a three-phase electrical machine, the control module 13 therefore has to generate a series of six control signals, and these signals, $SC_1$ to $SC_6$, must be, as already stated, in perfect synchronization with the angular position θ of the rotor 100 which detects the relative phases of the currents delivered by the outputs, 101 to 103, of the alternator-starter 10, according to an appropriate timing sequence, so as to obtain a correct functioning of the rectifier bridges, in particular to avoid any risk of damage to the semiconductor components, but also, and above all, in engine or starter mode, optimized torque supplied by the alternator-starter 10.

Digital circuits enabling control signals of the "all or nothing" type to be generated, with square or rectangular configuration, are well known in the art.

However, the need has arisen, not only to be able to generate such signals, but also to be able to modify their configuration at will, in a very flexible way, without significantly increasing the cost and the complexity of the circuits of the control module 12, in particular to be able to change from a mode of operation referred to as "full wave" to another mode of operation, without having to substantially modify the circuits constituting this module, or even change them entirely (for example by substitution of a complete electronic circuit card or of the module itself by another).

As has already been said, within the scope of the invention the word "polyphase" refers without distinction to biphase, triphase or hexaphase machines, more generally functioning at a number of phases equal to n (being any whole number greater than 1). The need has therefore also arisen to be able to accommodate these diverse machines, whatever n may be, again without having to modify "materially" or change the circuits constituting the control module.

SUMMARY OF THE INVENTION

The object of the invention is to respond to the needs set out above.

To do so, according to a first characteristic, the device according to the invention exploits the digitized value of the angular position to address a table containing control sequences for the power switching elements of the AC-DC current converter.

Advantageously, said table consists of a read-only memory, of the type known as ROM ("Read Only Memory").

The advantage of a device of this type is that it is easy to change from a polyphase machine of the order n, for example three-phase, to a polyphase machine of a higher or lower order, for example hexaphase, while changing only this table, which makes for great flexibility in the case of applications available for several types of machines. For example with a word table of n bits it is possible, without changing the structure of the card, to control a machine of any number n of phases, each bit controlling a single phase.

In one practical embodiment, which will be detailed below, the power switching elements, referred to as high and low, of each branch, i.e. of each phase, are controlled by the same bit but in opposite ways, traditionally with an idle time, thus producing a command called "full wave".

In a supplementary embodiment of the device according to the invention, if a full wave command is not appropriate, it is possible to add to the first table a supplementary table addressed in identical fashion, which enables separate control of the low and high power switching elements of each branch.

It is also possible to use only one table containing the two series of control sequences and two output series, a first series of outputs controlling the high power switching elements of each branch and a second series of outputs controlling the low power switching elements of each branch.

In another supplementary embodiment, the control device according to the invention generates pulse width modulated control signals (PWM). To do so, it includes supplementary circuits effecting a "logic AND" between the control signals generated by the table and a square signal with a variable cyclic ratio of a higher frequency than the electrical frequency of the rotary electrical machine.

Thus, the main object of the invention is a device for controlling an AC-DC current converter associated with a polyphase synchronous rotary electrical machine containing a rotor and a stator containing a plurality of windings connected to each other by their extremities, equal in number to the number of phases, said AC-DC current converter being disposed between said polyphase synchronous rotary electrical machine and a DC electrical energy storage unit containing terminals known as positive and negative, said AC-DC current converter containing, for each phase, a branch of two power switches in series, known as high and low, disposed between said positive and negative terminals, the midpoint between two power switches, high and low, constituting the inputs and/or the outputs of said AC-DC current converter and being connected to said extremities of connections of said windings, the control device containing means for generating an output signal representing the angular position of said rotor.

According to the invention, the converter control device includes at least one digital table containing a plurality of storage locations storing digital words addressed by said signal of the angular position of the rotor and delivering at its output binary control signals equal in number to the number of said phases, each binary control signal controlling the switching of said power switches, high and low, according to a predetermined timing sequence depending on the instantaneous value of said signal of the angular position of the rotor addressing said digital words.

According to another aspect, the invention also concerns a polyphase synchronous rotary electrical machine containing such a device.

BRIEF DESCRIPTION OF THE DRAWINGS

The invention will now be described in more detail, making reference to the attached drawings, in which.

DETAILED DESCRIPTION OF THE EXEMPLARY EMBODIMENTS

Figure 1:
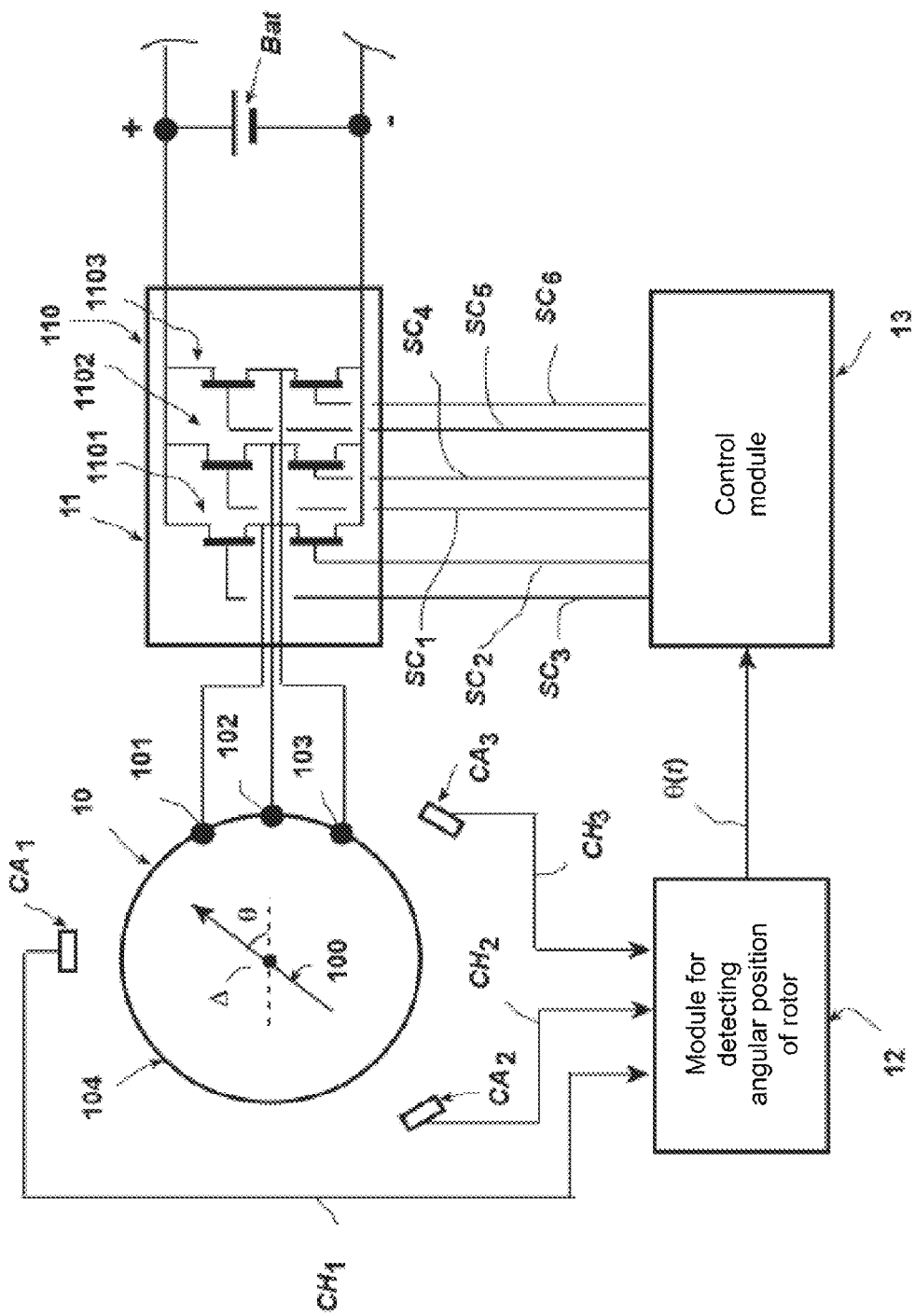
FIG. 1 is a diagram of one embodiment of a device for detecting the angular position of a rotor of an alternator-starter and for controlling an AC-DC current converter of prior art.

In the following, without in any way limiting its scope, reference will be made to the preferred scope of application of the invention, unless otherwise stated, i.e. a control device for an AC-DC current converter for a three-phase alternator-starter.

Also, in the following, the elements common to several figures bear the same references and will not be described again except as necessary.

FIG. 2A illustrates in diagram form a control device 2 for a reversible AC-DC current converter for a three-phase alternator-starter, in the mode of operation known as "full wave".

According to one of the essential characteristics of the invention, the control device 2 uses a digital table 20 addressed by a digital signal representing the angular position $\theta(t)$ of the rotor 101 (FIG. 1), supplied by the module 21. As has already been pointed out, this angular position can be detected by various methods, for example by the method taught in the aforementioned international patent application WO 2006/010864 A2 in the applicant's name.

In practical fashion, the digital table 20 may consist of a read-only memory, of the type known as "ROM" ("Read Only Memory"). This memory stores words of n bits. With a memory storing words of n bits, it is possible, without changing the structure, to control an AC-DC current converter for a synchronous rotary electrical machine of up to n phases, each bit controlling a single phase (in the example described, n=3).

In the example from FIG. 2A, the memory 20 is an 8-bit output memory, of which only three output bits, 200 to 202, are actually used.

FIG. 2A shows a circuit 25 constituted by the power switching elements (FIG. 1: branches, 1101 to 1103) of the reversible AC-DC current converter (FIG. 1: 11), henceforth referred to as 250H to 252H, for the power switching elements referred to as "high", and 250B to 252B, for power switching elements referred to as "low". Each branch of switches, high and low respectively, is controlled in the way known in the art by a series of circuits 24, known as "pilots" or "drivers" in the Anglo-Saxon terminology currently in use, in this instance three, 240 to 242. Each driver, 240 to 242, thus includes two inputs, corresponding to the high and low switches respectively.

In a mode of operation referred to as "full wave", each output bit or binary signal, 200 to 202, of the memory 20, controls one of the branches, in other words, one of the phases. More precisely, each bit, 200 to 202, controls both power switching elements, high and low, but in inverse fashion. To do this, supplementary circuits 23 are provided, consisting of n inverters or "NOT" logic gates according to the Anglo-Saxon terminology, three in this instance for three-phase current, 230 to 231. The direct bits and their inverses are transmitted to the first and second inputs of the drivers, 240 to 242, respectively. By way of example, the bit 200 and its inverse control, via the driver 240, the high and low power switching elements, 250H and 250B, respectively of the branch which corresponds to one of the phases, which will be called, for example, "phase 1" in arbitrary fashion.

As has already been pointed out, the use of the table 20, advantageously a ROM, enables great flexibility of adaptation, since each bit is dedicated to the control of one phase. So, without modifying the structure of the electronic card on which the components of the control device according to the invention are implemented, it is possible to adapt to diverse rotary electrical machines, up to n phases (n=8 in the case of the example described).

In certain operating conditions (for example, due to noise or high-frequency instability of the loop), untimely fluctuations in the value of the angular position calculated may occur which are detrimental to the correct function of the reversible AC-DC current converter 11, and may even tend to cause damage to the power switching elements constituted, if these are controlled at inappropriate moments (control signals incorrectly phase shifted, for example causing short-circuits).

Also, in a preferred embodiment, filtering of the type referred to as "hysteretic" is applied to this angular position (module 22) before sending it to the memory 20. A representative signal is obtained at the filtered output of the hysteretic system 22 to address locations in the memory 20.

Figure 2:
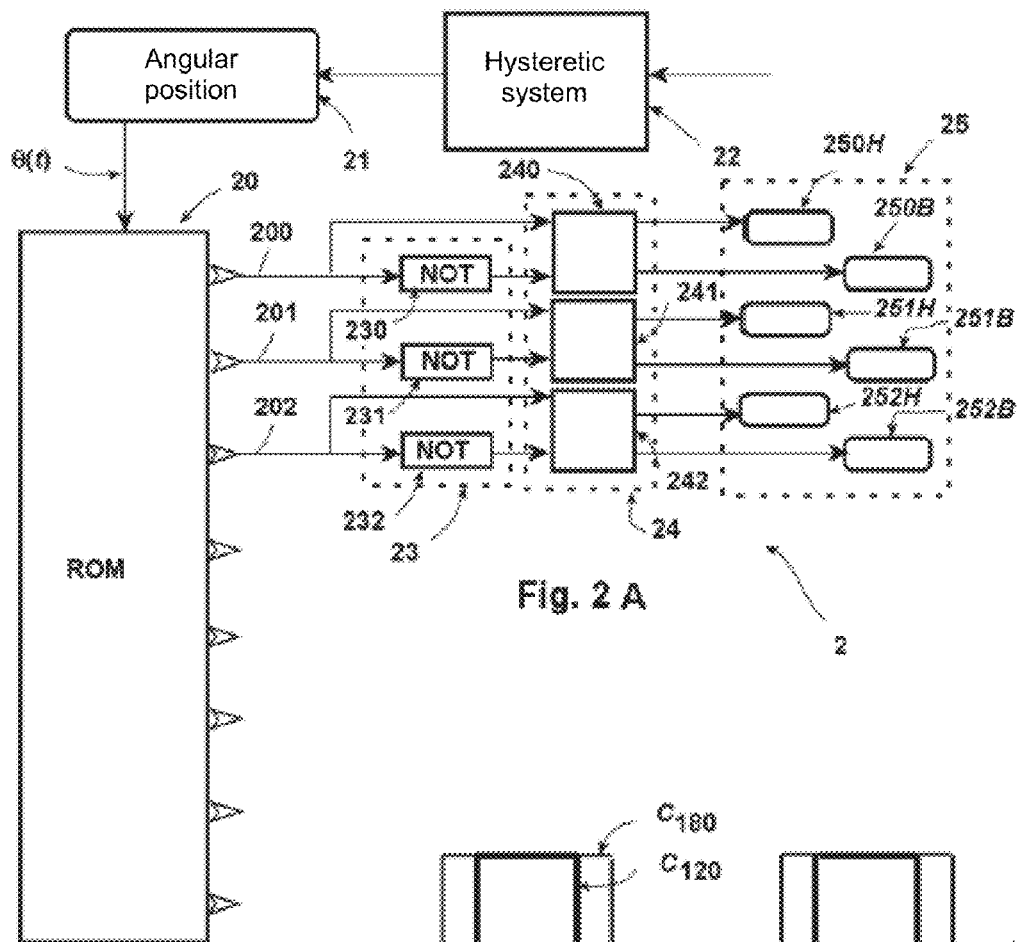
FIG. 2A is a diagram of a device for controlling an AC-DC current converter of a three-phase synchronous rotary electrical machine according to the invention, in a mode of operation referred to as "full wave"
FIG. 2B shows a block diagram of the functions of a hysteretic filtering module used in the device in FIG. 2A implementing a hysteretic filtering system.
Figure 2B:
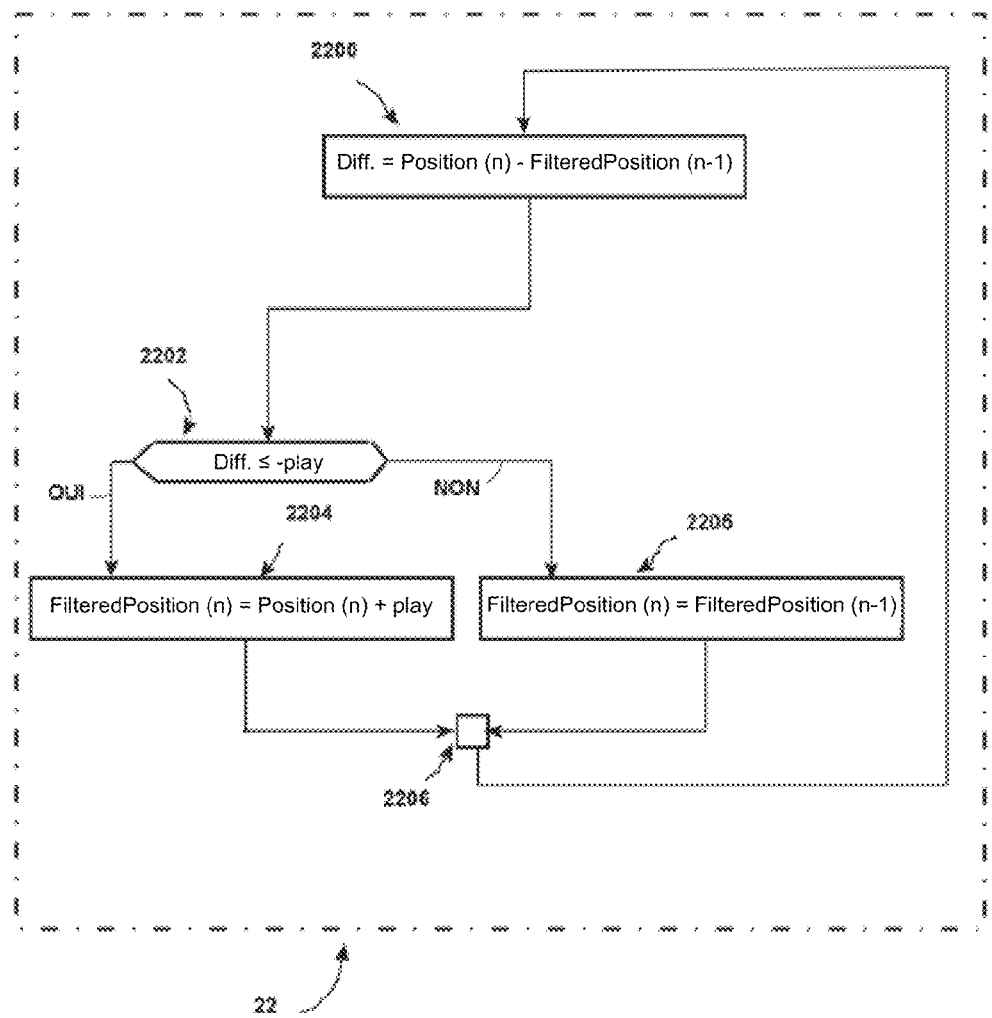

FIG. 2B is a block diagram illustrating one embodiment of a hysteretic filtering system 22 which can be used in the device 2 in FIG. 2A.

The hysteretic filtering system functions, by analogy, like mechanical play in a gear: when there is a change in direction of speed, a driven pinion does not reverse its position until any play between the teeth has been taken up, i.e. when the change in direction of speed has caused a displacement of the driving pinion equal to the play. It is possible to reproduce this behaviour by using the iterations described by the block diagram in FIG. 2B. Hereafter "play" will be used to refer to the value of this play, a value which depends on a certain number of physical parameters linked to the organs used in a real system 1 as in FIG. 1.

In the block 2200, the value of the difference is calculated, thus "Difference" between the filtered position at stage (n−1), thus "FilteredPosition (n−1)" and the position at stage n, thus "Position(n)", n being an arbitrary whole number. In block 2202, the "Difference" value is compared to the "−play" value. If the result of the comparison is less than or equal to "−play" ("YES" branch), the "Difference" value is sent to block 2204, if not, ("NO" branch), it is sent to block 2205. In block 2204, the value of "FilteredPosition(n)" is forced to the value of "Position(n)+play". In block 2205, the value "FilteredPosition(n)" is forced to the value "FilteredPosition(n−1)". The outputs of blocks 2204 and 2205 are added in a block 2206 and the output from this block 2206 is added to the output from block 2200 to do a new iteration (stage n+1).

The hysteretic filtering system 22 according to the block diagram from FIG. 2B makes it possible to apprehend the functioning of an electrical machine able to rotate in two directions, as is the case of the alterno-starter 10 from FIG. 1.

If the direction of control of the rotary electrical machine can only be unidirectional, it is sufficient to use an infinite "play" value, so that the position is only sent when it increases (anti-return type device equivalent to that of a wheel known as "ratcheted" in mechanics).

The control device in FIG. 2A enables a mode of function of the reversible AC-DC current converter (FIG. 1: 11) in the mode referred to as "full wave". The diagram in FIG. 3 illustrates this mode of function by the curve referenced as $C_{180}$. The positive alternation represents the voltage supplied by one of the power switching elements of a branch, for example the high element 250H, the negative alternation the voltage supplied by the low element 250B. These are full and consecutive half-periods, hence the index "180" used. Naturally, the pairs of control signals, $SC_1$-$SC_2$ to $SC_5$-$SC_6$ (FIG. 1), generated by the bits 200 to 202, must be phase shifted by 120° in the case in question (three-phase current).

If the "full wave" mode of function is not appropriate, the configuration of the tables can be modified (ROMs).

Figure 4B:
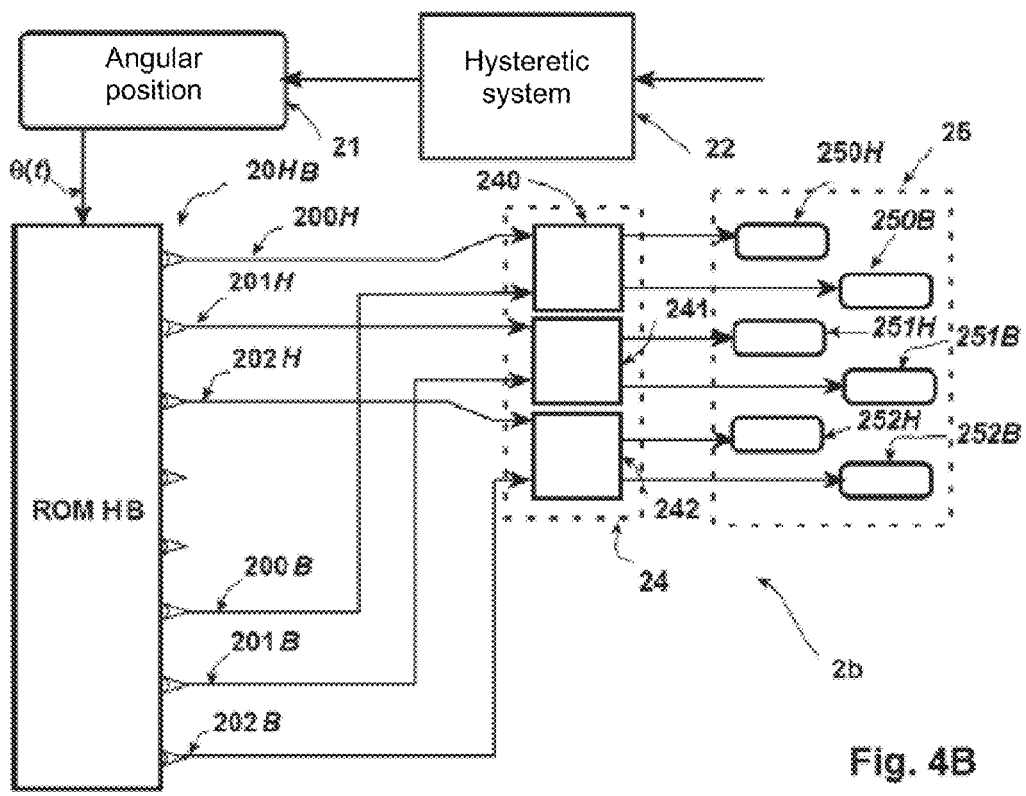
FIGS. 4A and 4B illustrate in diagram form two variant embodiments of a control device for an AC-DC current converter for a three-phase synchronous rotary electrical machine according to the invention in a different mode of operation from the mode known as "full wave"
Figure 1A:
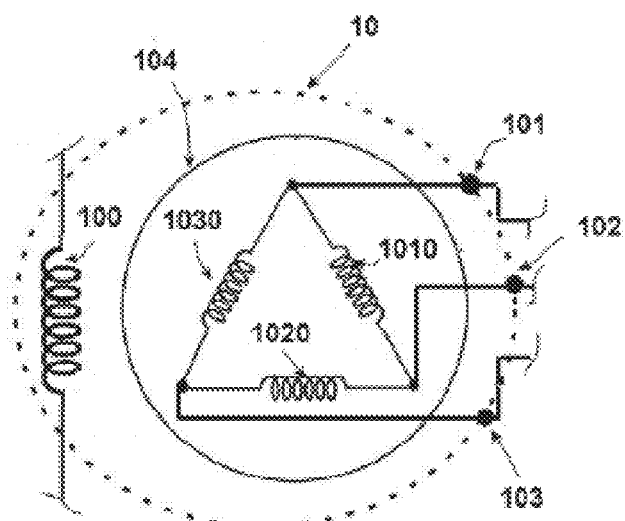
FIG. 1A is a detailed Figure illustrating the configuration of the alternator-starter from FIG. 1.
Figure 4A:
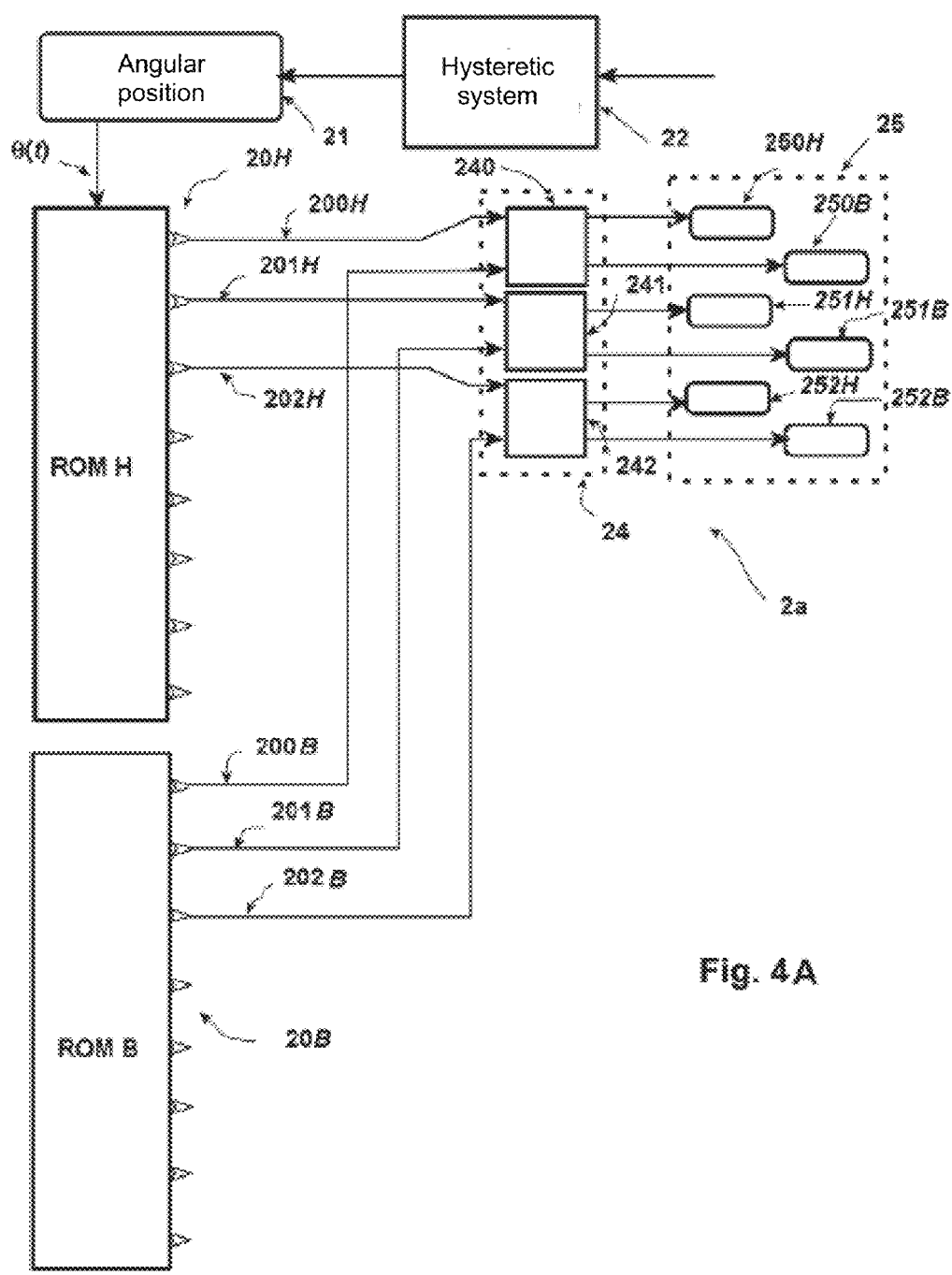

FIG. 4A illustrates a first example of a modified control device 2a using two ROMS, reference numbers 20H and 20B, for "High" and "Low". The two tables, 20H and 20B, are addressed by a single digital signal representing the angular position θ(t) of the rotor 101 (FIG. 1). This configuration allows separate control of the power switching elements, high and low respectively, of each branch, 1101 to 1103, by one of the tables, 20H or 20B. So, the phase can continue to float during a given time interval. The bits 200H to 202H generated by the memory 20H are designed to control the high power switching elements of each branch, thus of each phase, and the bits 200B to 202B the low power switching elements. These two series of bits are transmitted directly to the two series of corresponding inputs of the drivers 240 to 241.

For the sake of clarity, the curve $C_{120}$ in FIG. 3 illustrates an example of a different mode of function from the mode known as "full wave". In the example illustrated by this curve $C_{120}$, the high and low power switching elements, for example 250H and 250B, only conduct during 120° out of 180° of an alternation.

Figure 3:
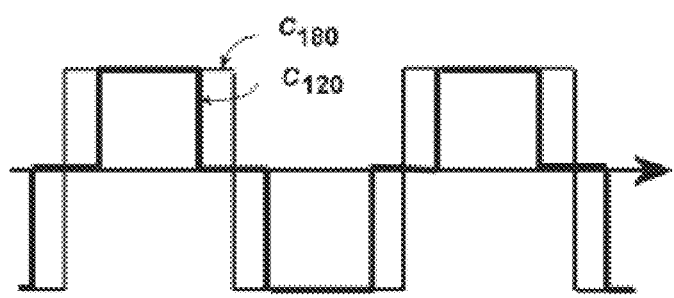
FIG. 3 is a diagram illustrating two control modes.

The other components of the device 2a in FIG. 4A are identical to those of the device 2 in FIG. 2, and there is no need to describe them again.

As before, a hysteretic filter 22 can be used as required (described in detail with respect to FIG. 2A).

Of course, the tables constituted by the memories, 20H and 20B, must be coded so as to avoid controlling the two power switching elements separately, even if it is preferable to block this prohibited function directly at the level of the drivers, 240 to 242, of the power switching elements 25.

This configuration, however, has the disadvantage of requiring the presence of two memories, although these memories may be identical in terms of their material configuration (pinning).

It is, nevertheless, possible to utilize only one memory, as shown by FIG. 4B which illustrates a second example of a modified control device. According to this embodiment, only a single table constituted by a single ROM 20HB is used. In this case, a greater number of output bits from the memory 20HB are used, precisely double, with an identical number of controlled phases. By correlation, the possibilities of extension, with a constant number of pins are all the more limited.

Bits 200H to 202H, firstly, and bits 200B to 202B, secondly, play an identical role to that of the corresponding bits of the device 2b in FIG. 4A. It is sufficient therefore to code the memory 20HB and to store in it the necessary words to obtain this result. The other components of the device 2b operate in exactly the same way as those of the device 2a. So there is no need to describe them again.

As before, a hysteretic filter 22 can be used as required (described in detail with respect to FIG. 2A).

Finally, it is possible to control the power switching elements 25 of the reversible AC-DC current converter 11 (FIG. 1) by relying on pulse width modulation ("PWM" in the Anglo-Saxon terminology currently in use).

Figure 5:
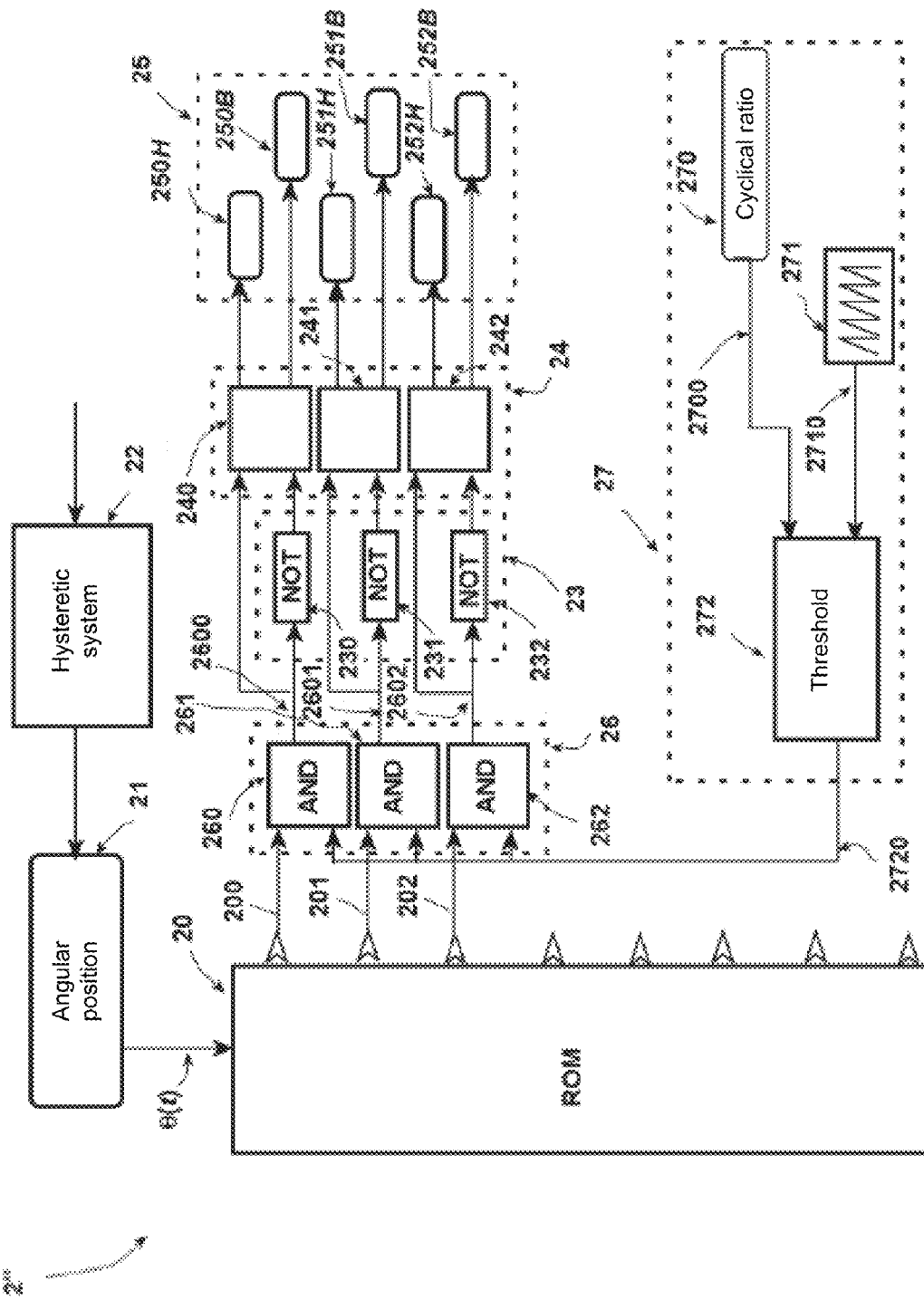
FIG. 5 illustrates in diagram form a control device for an AC-DC current converter for a three-phase synchronous rotary electrical machine according to the invention in a mode of operation using pulse width modulation.

FIG. 5 illustrates an example of a control device 2" according to the invention of this type.

The structure of the control device 2" is similar to that of the control device 2 in FIG. 2, in the sense that a single memory 20 and a series 23 of "NOT" logic gates, 230 to 232, are used. However, a series 26 of "AND" logic gates, 260 to 262, in the Anglo-Saxon terminology currently in use, is interposed between the single memory 20 and the series 23 of "NOT" logic gates and the series 24 of drivers. The "AND" logic gates, 260 to 262, receive the output bits, 200 to 202, of the memory 20 at a first input.

In a way similar to the device 2 in FIG. 2, the output bits, 2600 to 2602, of the "AND" gates 260 to 262, each control the high and low power switching elements of one of the branches of switches, hence of one phase. They are sent directly to a first input of the drivers, 240 to 242, firstly, and in inverted form, to a second input of these same drivers, 240 to 242, secondly.

The second inputs of the "AND" logic gates, 260 to 262, receive from a module 27 the same control signal 2720 generated by a threshold circuit 272. In the way known in the art, this gate 272 receives, at a first input, a cyclic ratio control signal 2700, adjustable at will, generated by a gate 270, and at a second input, a saw tooth signal 2710 generated by the high frequency clock gates 271. Depending on the duration of the cyclic ratio control signal 2700, the "AND" gates let through the logic values of the control bits, 200 to 202, present at the outputs of the memory 20, during shorter or longer fractions of each semi-alternation (between 0° and 180°), when the signal 2700 is in a first logic state, for example logic "1", and blocks them when it is in a second logic state, logic "0". The control pulses, 2600 to 2602, of the power switching elements, are thus well modulated in terms of pulse width ("PWM").

As before, a hysteretic filter 22 can be used as required (described in detail with respect to FIG. 2A).

A practical embodiment of a complete control device 2''' according to the invention will now be described with reference to FIG. 6. The control device 2''' authorizes diverse modes of function.

Figure 6:
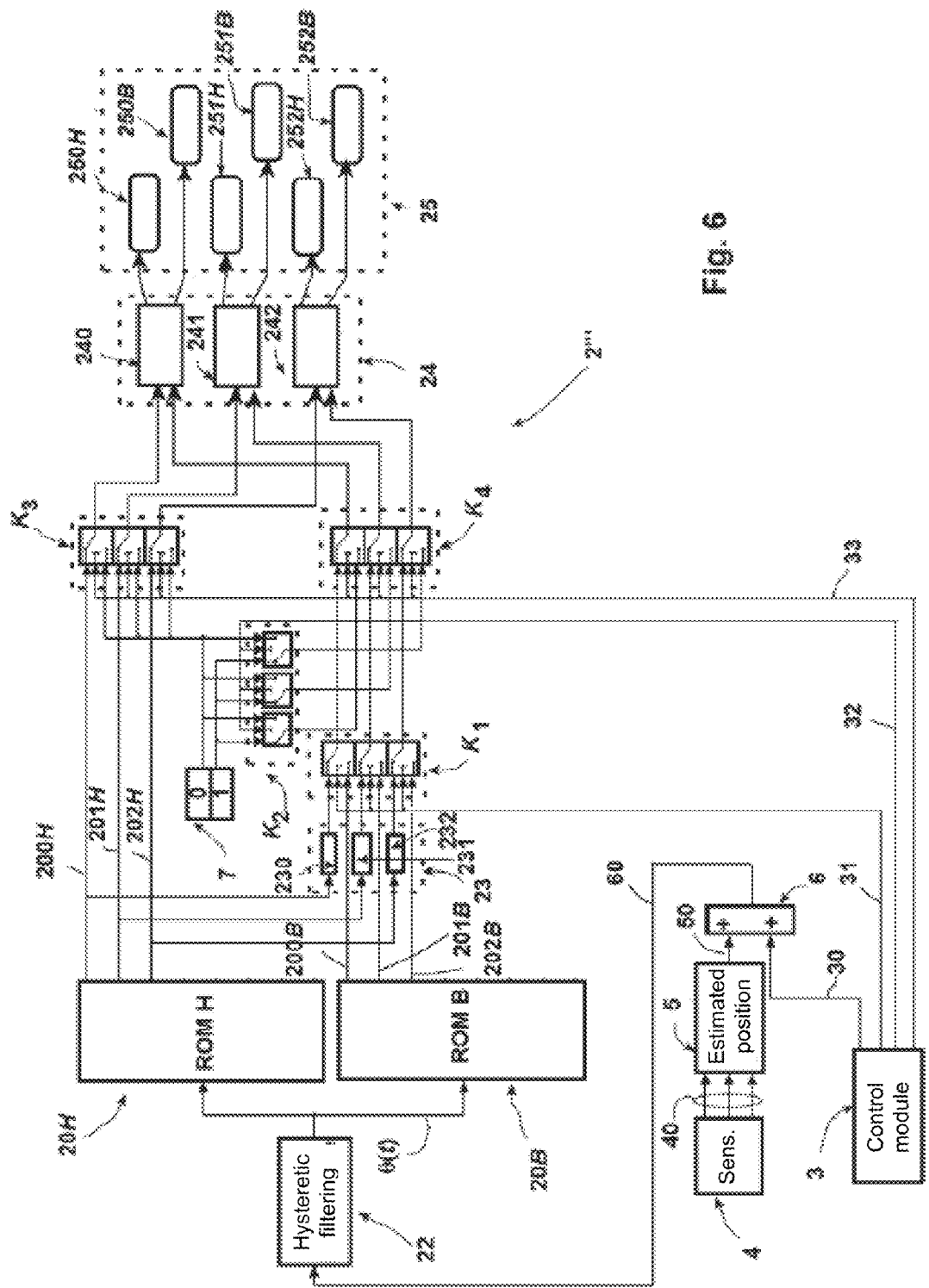
FIG. 6 illustrates in diagram form a complete embodiment of a control device for an AC-DC current converter for a three-phase synchronous rotary electrical machine according to the invention, enabling diverse operating modes.

In the first place, the layout in FIG. 6 allows operation, or not, in what is known as "full wave" mode. It is also provided with additional functions, which will be detailed below.

To do so, in accordance with the essential characteristics of the invention, it includes tables constituted of ROMs, addressable by the digital value of the angular position of the rotor 101 (FIG. 1). More precisely, the device 2''' is provided with two memories, 20H and 20B, playing a role similar to the memories of the same reference numbers from FIG. 4A when they are used simultaneously.

The device 2''' includes, as previously, a series of power switching elements 25 and of drivers 24 of these power switching elements. There is no need to describe them again.

Again as previously, a hysteretic filter 22 can be used as required (described in detail with respect to FIG. 2A).

FIG. 6 also shows a module 4 containing the sensors $CA_1$ to $CA_3$ from FIG. 1 and delivering at their outputs (single reference 40) the signals generated by these sensors, three in this instance for a three-phase machine, n in general. The signals 40 are sent to a module 5 for estimating the angular position of the rotor 101: digital output signal 50. The module 5 plays a role similar to the module 12 from FIG. 1, the output signal 50 being estimated on the basis of linear combinations of the signals 40, as has already been stated.

The device 2''' further contains a function control module 3 delivering four distinct control signals as output, in the example described, 30 to 33.

The first control signal, 30, is a phase advance control signal. It is sent to a second input of a digital adder 6 receiving at its first input the estimated digital signal 50 of the angular position of the rotor 101. The estimated angular position of the rotor 50 will be modified depending on the digital value of the signal 30, which will amount to modifying the phase of the control signals of the power switching elements 25.

The output signal 60 of the adder 6 is sent to the hysteretic filtering module 22, which delivers as output a filtered digital value θ(t) of the angular position of the rotor, possibly modified by the phase advance control signal 30. This value θ(t) is used to address the memories 20H and 20B.

The device 2''' contains, lastly, four banks of three relays, reference numbers $K_1$ to $K_4$, functioning as a two-way junction, the usefulness of which will be explained below.

First of all, although these are shown in the form of galvanic relays, it must be understood that these may also be relays of any technology, in particular electronic relays.

The relays in banks $K_3$ and $K_4$ are controlled by a binary signal 33 from the function control module 3. The function of this signal is to enable the stoppage or the blockage of the control bits generated by the memories 20H and 20B: "ON/OFF" function, according to the Anglo-Saxon terminology currently in use. When the signal 33 is in the arbitrary logic state "1", the upper path of the relays $K_3$ and $K_4$ is conducting. When the signal 33 is in logic state "0", the lower path of the relays $K_3$ and $K_4$ is conducting.

The relays in bank $K_1$ receive a binary control signal 31 from the function control module 3. The logic value, "1" or "0", of the signal 31 determines whether the device 2''' should function in "full wave" mode or not. The relays of the bank $K_1$ thus make it possible to choose either of these two modes of function.

In the first case, the upper path of the relays $K_1$ is conducting and only the output bits, 200H to 202H, of the memory 20H are taken into account. In fact, the bits 200H to 202H are sent directly, on the one hand to the first inputs of the drivers 240 to 242, via the conducting upper paths of the relays $K_1$, and, on the other, in inverted form, by the action of the "NOT" gates, 230 to 232, to the second inputs of these same drivers, 240 to 242, via the conducting upper paths of the relays $K_4$. In this case, the function is thus very similar to that of the device in FIG. 2.

In the second case, the lower path of the relays $K_1$ is conducting. It follows that the output bits, 200H to 202H, of the memory 20H are sent to the first inputs of the drivers 240 to 242, via the conducting upper paths of the relays $K_3$, and the bits 200B to 202B of the memory 20B are sent to the second inputs of the drivers, 240 to 242, via the conducting lower paths of the relays $K_1$ and upper paths of the relays $K_4$. The function is then very similar to that obtained with the device 2a from FIG. 4A. It would of course be possible, in a supplementary variant embodiment, to replace the two memories 20H and 20B by a single memory, as in the case of the device 2b in FIG. 4B.

Finally, it is possible to force the reversible AC-DC current converter 11 (FIG. 1), when it functions as a current generator (alternator mode of function), into a mode of short-circuiting the phase windings of the stator of the alternator-starter 10 (FIG. 1), more generally of the phase windings of the stator of the synchronous rotary electrical machine. This short-circuit mode is especially of interest for braking a thermal engine when it stops.

The short-circuit mode is controlled via the binary signals 32 and 33 controlling the relays $K_2$, $K_3$ and $K_4$.

The configuration of the gate for the relays $K_2$, $K_3$ and $K_4$ is such that when the signal 33 is in logic state "1", the memories 20H and 20B are operating and define the control of the power switches of the converter.

When the signal 33 is in logic state "0", it is the logic state of the signal 32 which forces the state of the power switches to an "open" or "closed" state. The signal 33 being in logic state "0", if the signal 32 is in logic state "0", the power switches are open and the stator windings are then in a state of disconnection. The signal 33 being in logic state "0", if the signal 32 is in logic state "1", the power switches are open and the stator windings are in a state of short-circuit.

On reading the above, it can easily be seen that the invention certainly achieves the aims set by it, and there is no need to recapitulate all of it.

However, the invention is not limited only to the devices which conform to the embodiments explicitly described in respect of FIGS. 2 to 6, nor only to the preferred application relating to the control of a reversible AC-DC current converter 11 associated with a three-phase alternator-starter.

Without exceeding the scope of the invention, the device can be applied to any polyphase rotary machine, for example biphase, triphase, hexaphase, etc., in engine (starter) mode, and/or alternator mode (current generator), which allows precisely the utilization of digital tables addressed by the digital value of the angular position of the rotor, according to one of the essential characteristics of the invention. These tables are advantageously produced on the basis of read-only memories, of the ROM type, but could equally well be produced on the basis of reprogrammable memories of the PROM type (for "Programmable Read Only Memory") or similar.

Finally, it must be understood that the digital values have only be provided to show more clearly the characteristics of the invention and are not intended in any way to limit its scope. In particular, they depend on the precise application planned and their selection remains within the capacity of the person skilled in the art.

The invention claimed is:

1. A control device in combination with an AC-DC current converter electrically connected to a polyphase synchronous rotary electrical machine comprising a rotor and a stator comprising a plurality of windings connected together at their extremities, a number of windings being equal to a number of phases of said polyphase synchronous rotary electrical machine;

said AC-DC current converter being disposed between said polyphase synchronous rotary electrical machine and a DC electrical energy storage unit including positive and negative terminals, said AC-DC current converter comprising, for each phase, a branch of high and low power switches connected in series and disposed between said positive and negative terminals, the midpoint between said high and low power switches comprising at least one of inputs and outputs of said AC-DC current converter and being connected to said extremities of said windings;

said control device comprising:

means of generating an angular position signal representing the angular position of said rotor; and at least one digital table (20) comprising a plurality of storage locations storing digital words addressed by said angular position signal ($\theta(t)$) and delivering at an output thereof direct binary control signals (200-202) equal in number to the number of said phases;

each of said binary control signals (200-202) controlling the switching of said high and low power switches (250H to 252B) according to a predetermined timing sequence depending on the instantaneous value of said angular position signal ($\theta(t)$) addressing said digital tables (20).

2. The control device according to claim 1, further comprising a single digital table (20) addressed by said signal of the angular position of the rotor ($\theta(t)$) and a plurality of inverter logic gates (230-232), equal in number to the number of said phases, wherein each of said direct binary control signals (200-202) is sent, firstly, to an input of one of said inverter logic gates (230-232) to generate an inverse binary control signal, and, secondly, as switching control signal, to one of said high and low power switches (250H-252H) of one of said branches of said AC-DC current converter (11), and wherein said inverse binary control signal is sent as switching control signal to said low power switch (250B-252B)

of the same branch, so as to obtain a "full wave" ($C_{180}$) mode of function of said power switches (250H to 252B), each of said power switches is controlled as all or nothing, alternating during two full consecutive half-periods.

3. The control device according to claim 1, further comprising first (20H) and second (20B) digital tables, both addressed by said angular position signal ($\theta(t)$) and delivering at their outputs the same number of said binary control signals (200H-202B), associated in pairs, wherein each of said binary control signals (200H-202B) delivered by said first digital table (20H) is sent as switching control signal to one of said high power switches of one of said branches, and wherein said binary control signal (200B-202B) delivered by said second digital table (20B) associated with it is sent as switching control signal to said low power switch of the same branch, such that said power switches (250H to 252B) are controlled, as all or nothing, alternately during a fixed fraction of consecutive half-periods ($C_{120}$) depending on a particular coding of said digital words stored in said first and second digital tables and to obtain a different mode of function from a "full wave" mode.

4. The control device according to claim 1, further comprising a single digital table (20HB) addressed by said signal of the angular position of the rotor ($\theta(t)$), wherein said single memory (20HB) delivers as output first (200H-202H) and second (200B-202B) series of binary control signals equal in number to the number of said phases and associated in pairs, and wherein said binary control signals of each of said pairs (200H-202H, 200B-202B) are sent as switching control signals to said high and low power switches of the same branch, such that said power switches are controlled as all or nothing, alternately, during a fixed fraction of consecutive half-periods ($C_{120}$) depending on a particular coding of said digital words stored in said single digital table and to obtain a different mode of function from a "full wave" mode.

5. The control device according to claim 1, further comprising a single digital table (20) addressed by said signal of the angular position of the rotor ($\theta(t)$), a plurality of "AND" logic gates (260-262) and of inverter logic gates (230-232), said gates being equal in number to the number of said phases, wherein each of said "AND" logic gates (260-262) receives at a first input a pulse width control signal (2720) in a first logic state during fixed periods of time and at a second input one of said binary control signals (200-202), so as to generate as output a direct binary control signal (2600-2602) during said fixed periods of time, wherein said direct control signal is sent, on the one hand, to the input of one of said inverter logic gates (230-232) to generate an inverse binary control signal and, on the other hand, as switching control signal to one of said high power switches of one of said branches of said AC-DC current converter (11), and wherein said inverse binary control signal is sent as switching control signal to said low power switch (250B-252B) of the same branch, such that said power switches (250H to 252B) are controlled as all or nothing, alternately, during fixed fractions of consecutive half-periods, functions of said fixed periods of time are imposed by said pulse width control signal (2720) to obtain a pulse width modulation.

6. The control device according to claim 5, further comprising a circuit to generate said pulse width control signal (27) containing clock circuits (271) delivering saw tooth signals of a fixed frequency, a control circuit (270) delivering a cyclical ratio control signal (2700) and a threshold circuit (272) delivering at its output said pulse width control signal (2720), in said first logic state when said cyclical ratio control signal (2700) attains a fixed threshold and in a second logic state below this threshold, and wherein said pulse width control signal (2720) authorizes the generation of said direct control signals by said "AND" logic gates (260-262) when said pulse width control signal is in said first logic state.

7. The control device according to claim 1, further comprising first (20H) and second (20B) digital tables, both addressed by said signal of the angular position of the rotor ($\theta(t)$) and delivering at their outputs the same number of binary control signals (200H-202H, 200B-202B), equal in number to the number of said phases and associated in pairs, and a plurality of inverter logic gates (230-232) equal in number to the number of said phases and a plurality of first two-pole relays ($K_1$), equal in number to the number of said phases, each containing upper and lower signal inputs, and a control input to selectively route said input signals to a single output, wherein each of said direct binary control signals is sent, firstly, to the input of one of said inverter logic gates (230-232) to generate an inverse binary control signal, and, secondly, as switching control signal, to one of said high power switches (250H-252H) of one of said branches of said AC-DC current converter (11), in that each of said inverse binary control signals is sent to said upper input of one of said first two-pole relays ($K_1$) and each of the binary control signals delivered by the second digital table (20B) is sent to said lower input of the same first two-pole relay ($K_1$), and said device further comprising means of function control (3) to generate a mode of function control signal (31) sent to said control inputs of said first two-pole relays ($K_1$) to route as output, when said mode of function control signal is in a first logic state, said inverse binary control signals as switching control signals of said low power switches (250B-252B), so as to obtain said "full wave" mode of function of said power switches (250H to 252B), each of said power switches is controlled as all or nothing, alternately during two full consecutive half-periods ($C_{180}$), and, when said mode of function control signal is in a second logic state, said binary control signals delivered by said second digital table (20B), as switching control signals of said low power switches (250B to 252B), such that said high and low power switches (250H to 252B) are controlled as all or nothing, alternately during a fixed fraction of consecutive half-periods ($C_{120}$) depending on a particular coding of said digital words stored in said first and second digital tables and to obtain a different mode of function from said "full wave" mode.

8. The control device according to claim 7, further comprising a plurality of second ($K_3$) and a plurality of third ($K_4$) two-pole relays, equal in number to the number of said phases, each including upper and lower signal inputs, and a control input to selectively route said input signals to a single output, wherein said second two-pole relays ($K_3$) each receive, at said upper input, one of said binary control signals (200H-202H) delivered by said first digital table (20H), wherein each of said third two-pole relays ($K_4$) receives at an upper input thereof one of said binary control signals present at the outputs of said first two-pole relays ($K_1$), and wherein said function control means (3) generate as output a supplementary binary signal (33) taking "ON/OFF" logic states, respectively, authorizing transmission to said high and low power switches (250H to 252B) of said binary control signals (200H to 202H) delivered by said first digital table (20H) and present at said outputs of said first two-pole relays ($K_1$), when it is in said first state, and blocking them when it is in said second state.

9. The control device according to claim 8, further comprising means of storage with two binary positions (7), defining logic states "1" and "0", and a plurality of fourth two-pole relays ($K_2$), equal in number to the number of said phases, containing upper and lower signal inputs, and a control input to route said input signals selectively to a single output, said storage means with said two binary positions (7) and said plurality of fourth two-pole relays ($K_2$) authorizing, depending on said logic states of dedicated mode control signals (32, 33), a short-circuit mode in said stator windings or a mode of disconnection of said stator windings.

10. The control device according to claim 7, further comprising means (6) for modification of the phase of said angular position signal ($\theta(t)$), wherein said function control means (3) generate a supplementary phase advance signal (30), and wherein said phase modification means (6) receive at a first input said phase advance signal (30) and at a second input the output signal (50) of said means of generation (5) of said angular position signal so as to generate at their output said angular position signal, the phase of which has been modified depending on a value of said phase advance signal (30).

11. The control device according to claim 10, wherein said phase advance signal (30) and said angular position signal (50) are digital, said means of phase modification consist of a digital adder (6) with two inputs to which said signals (30, 50) are sent.

12. The control device according to claim 1, wherein said output of said means of generation of said angular position signal is connected to an input of hysteretic filtering means (22); and wherein an output of said hysteretic filtering means generates a signal representing a filtered angular position of said rotor ($\theta(t)$) utilized to address said digital tables.

13. The control device according to claim 1, wherein said at least one digital table (20) is a read-only memory, containing a fixed number of outputs delivering said binary control signals.

14. The control device according to claim 13, wherein said memory contains eight outputs delivering binary control signals.

15. The control device according to claim 1, wherein said polyphase synchronous rotary electrical machine is an alternator-starter (10) provided to function in one of alternator mode and starter mode.

16. The control device according to claim 15, wherein said AC-DC current converter is a reversible AC-DC current converter (11).

17. The control device according to claim 1, wherein said power switches of said AC-DC current converter are MOSFET power transistors (110).

18. The control device according to claim 1, wherein said polyphase synchronous rotary electrical machine (10) is a three-phase machine.

19. A polyphase synchronous rotary electrical machine (10) comprising a rotor (100) and a stator (104), an AC-DC current converter (11) and a control device for said AC-DC current converter (11) according to claim 1.

20. The control device according to claim 1, wherein said at least one digital table is a programmable read-only memory.

21. The polyphase synchronous rotary electrical machine (10) according to claim 19, wherein said polyphase synchronous rotary electrical machine is an alternator-starter (10) provided to function in one of alternator mode and starter mode.

* * * * *